April 6, 1943.   A. H. AHRNDT   2,315,761
BREAD SLICER
Filed March 18, 1940   8 Sheets-Sheet 1

INVENTOR.
Arthur H. Ahrndt
BY John A. Marzall
ATTORNEY.

April 6, 1943.         A. H. AHRNDT             2,315,761
                        BREAD SLICER
             Filed March 18, 1940        8 Sheets-Sheet 2

FIG.2

INVENTOR.
Arthur H. Ahrndt
BY John A. Marzall
ATTORNEY.

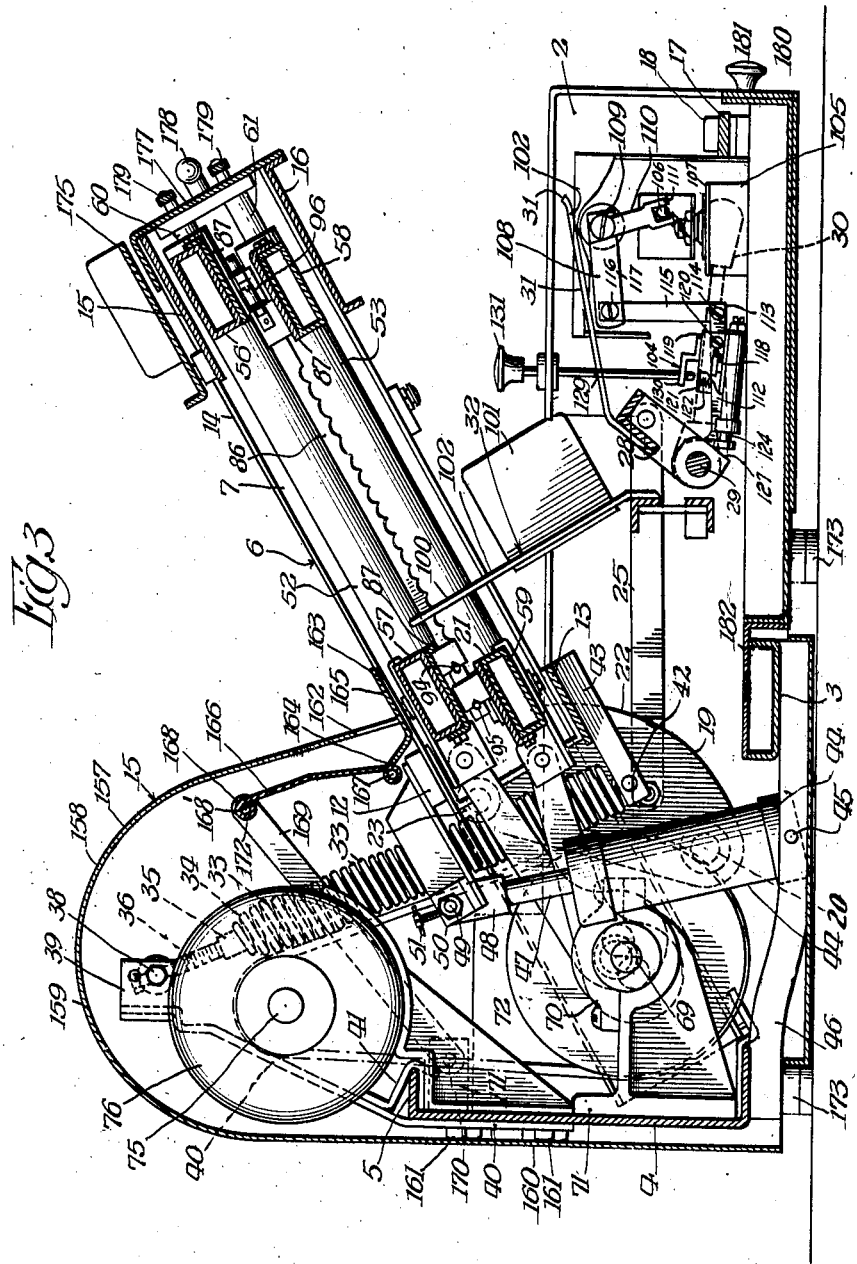

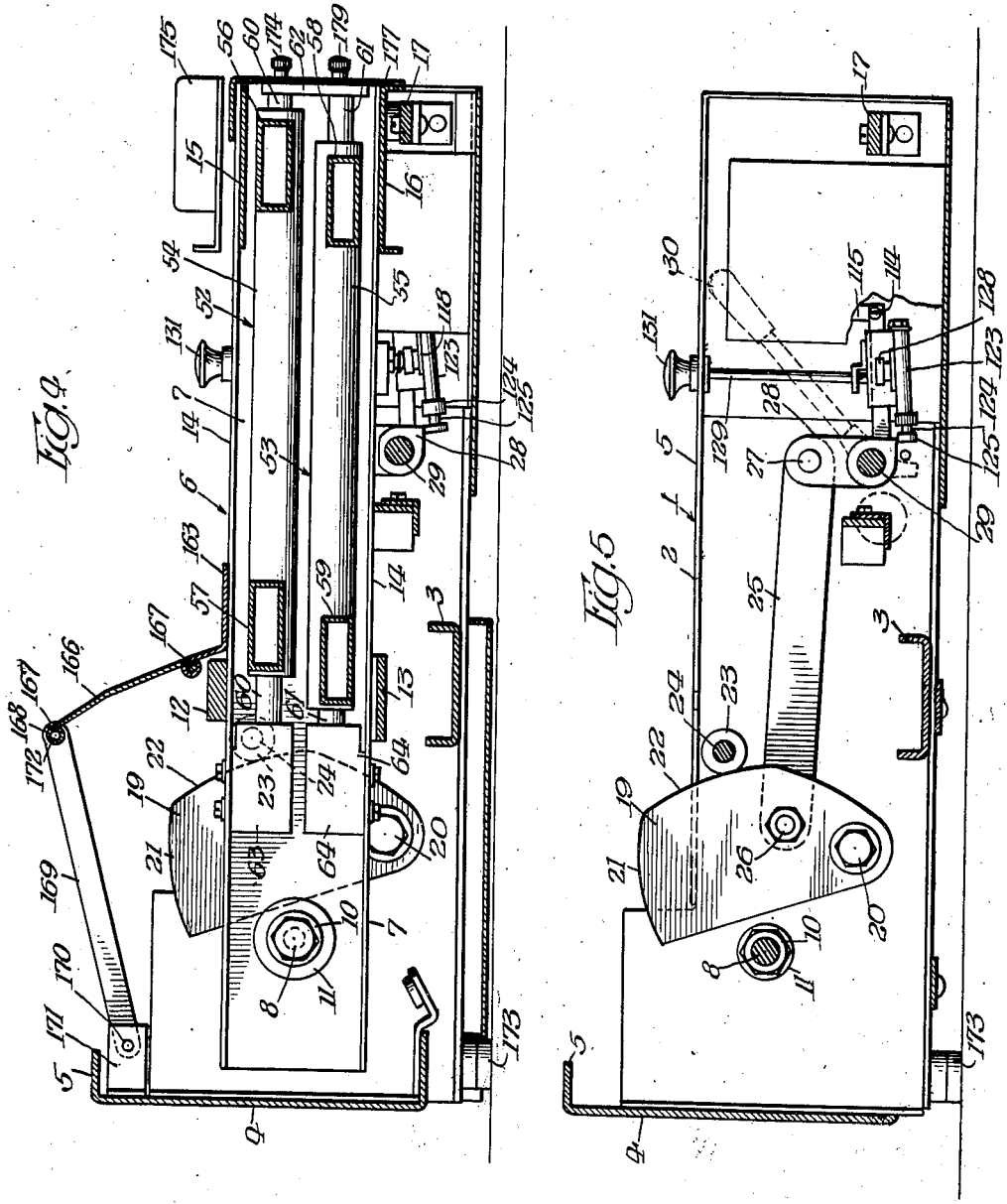

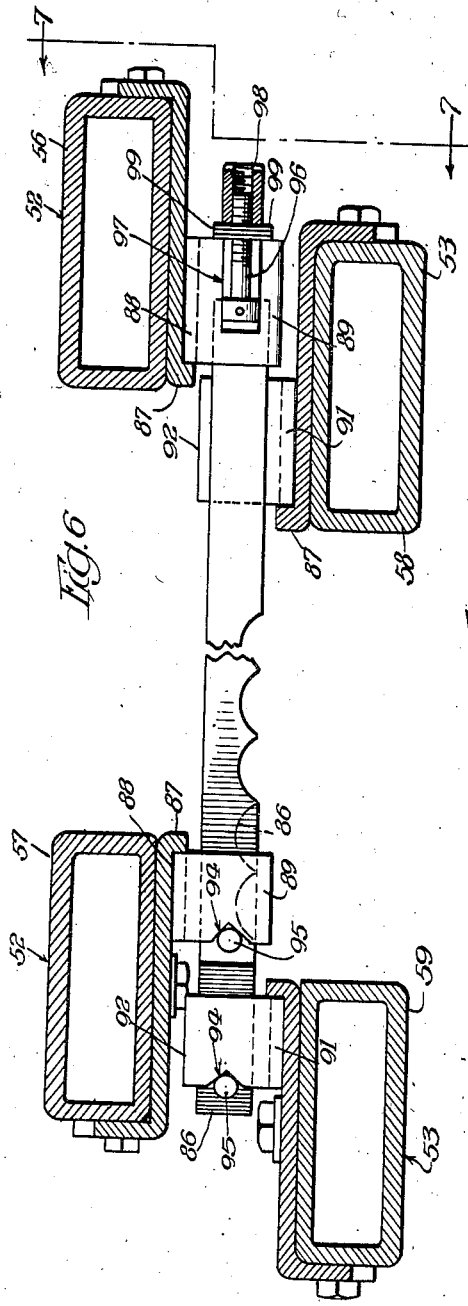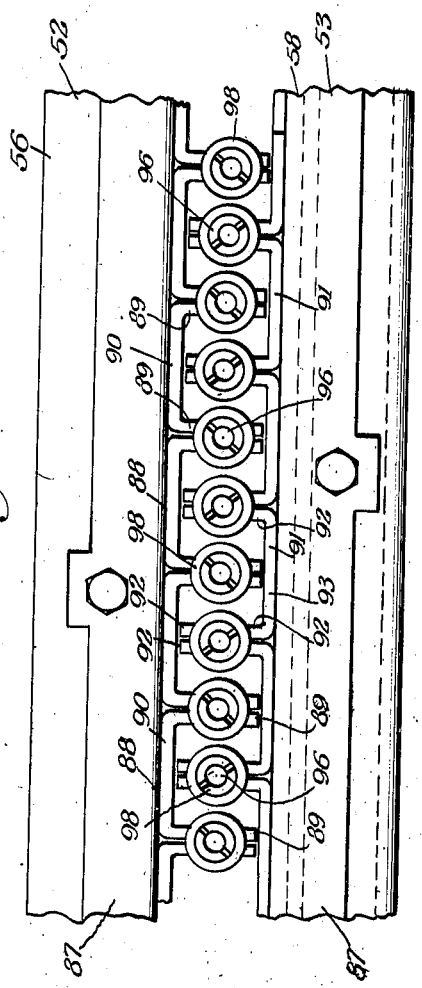

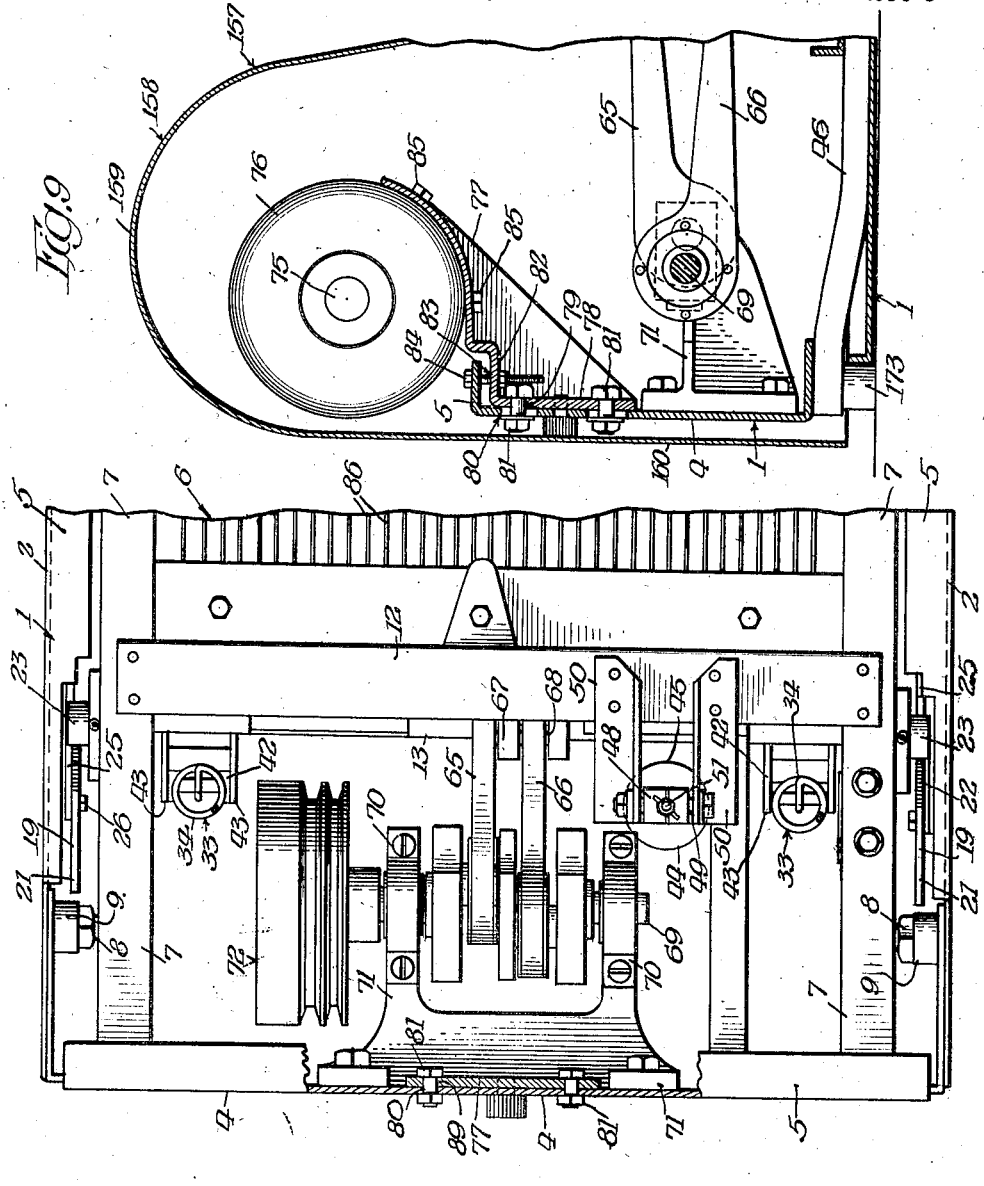

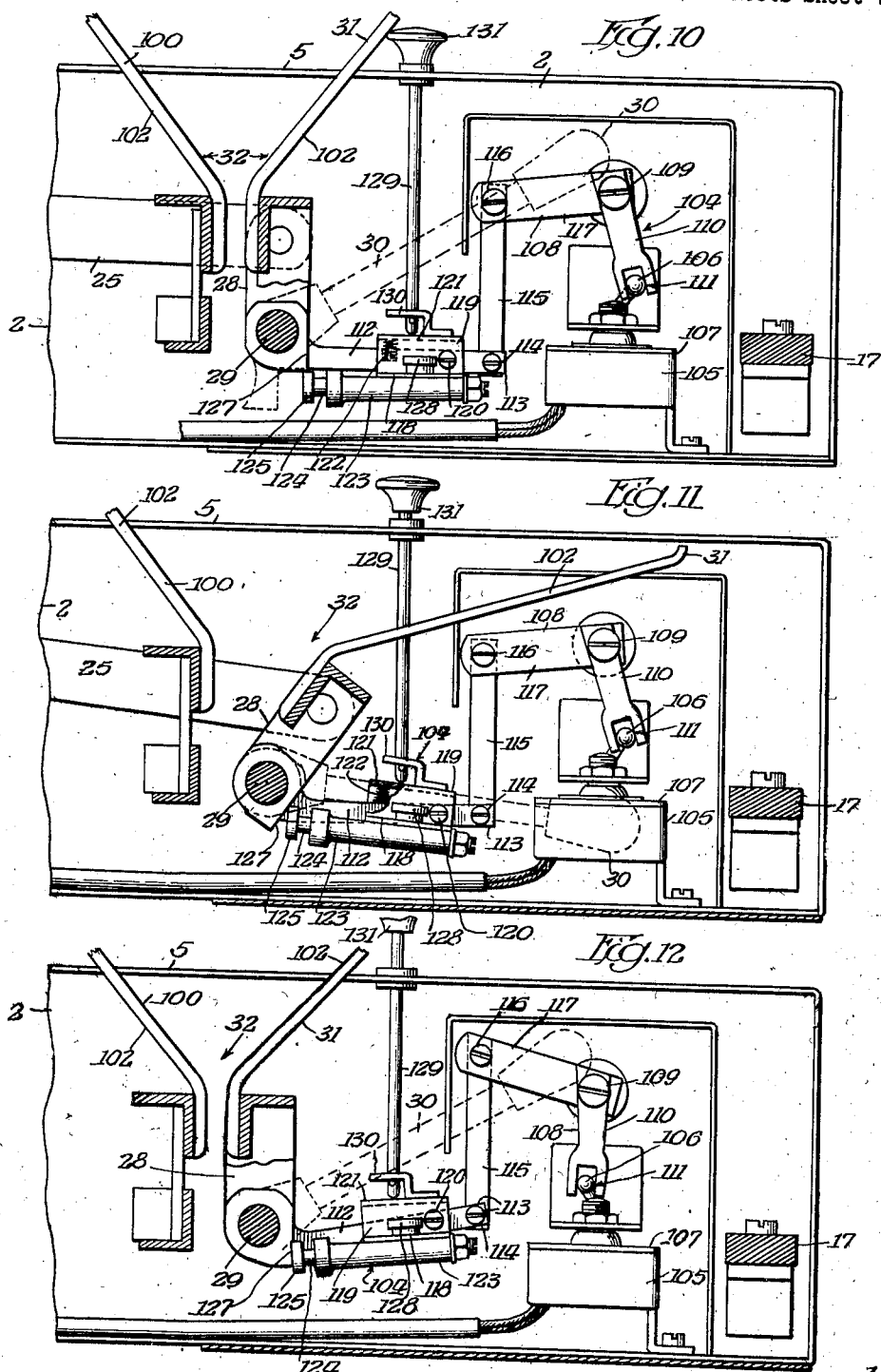

April 6, 1943.   A. H. AHRNDT   2,315,761
BREAD SLICER
Filed March 18, 1940   8 Sheets-Sheet 8
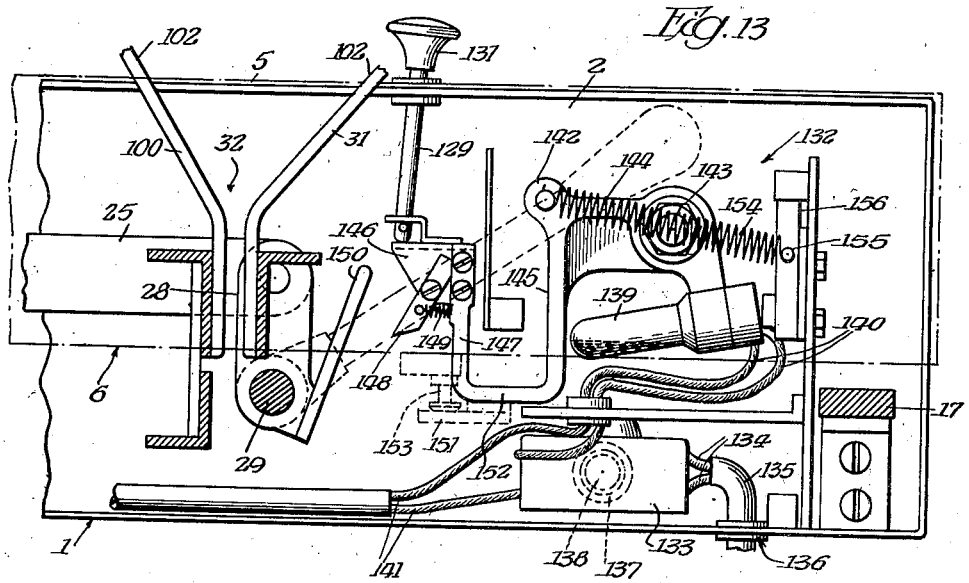
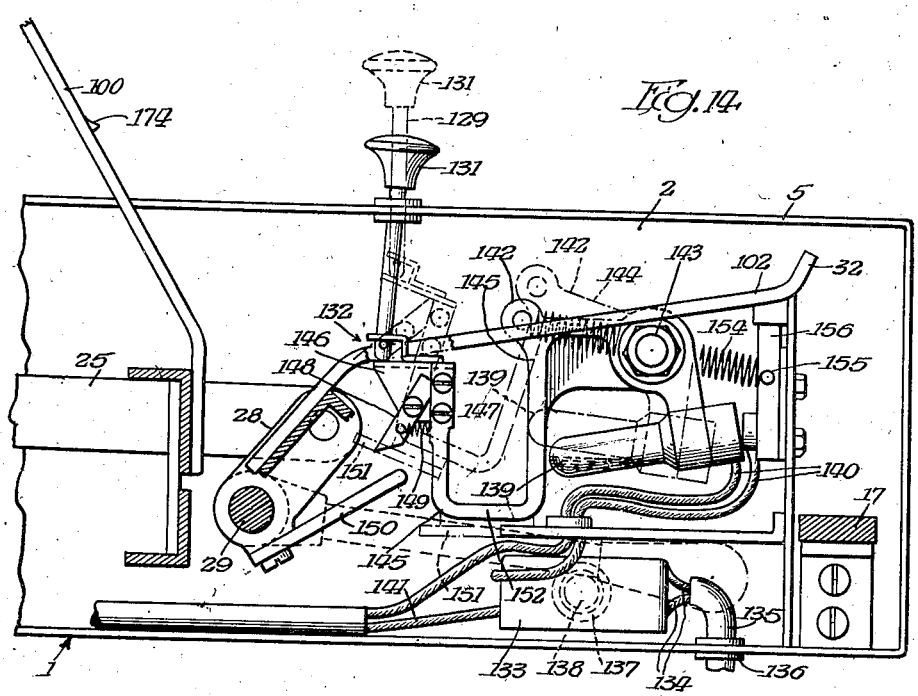
Inventor
Arthur H. Ahrndt
By John A. Marzall
Atty.

Patented Apr. 6, 1943

2,315,761

UNITED STATES PATENT OFFICE 2,315,761

BREAD SLICER

Arthur H. Ahrndt, La Porte, Ind., assignor to U. S. Slicing Machine Company, La Porte, Ind., a corporation of Indiana Application March 18, 1940, Serial No. 324,484
In Great Britain April 19, 1939

27 Claims. (Cl. 146—147)

This invention relates to slicing machines in general and particularly to machines for slicing edible substances. More specifically, the invention relates to a slicing machine for slicing loaves of bread into slices of a predetermined thickness.

The primary object of the invention is to provide an efficient, safe, and compact slicing machine wherein a loaf of bread to be sliced is arranged and supported in proper position away from the slicing knives so as to overcome any chance of the operator coming in contact with the knives during the loading operation, the knives being arranged on a pivotally mounted element movable in a vertical arc and adapted to be raised from the loading platform; the said element carrying a plurality of alternately reciprocal knives which are inoperative during the loading operation, but which are brought into operation by the mere manual manipulation of a handle which releases the knife supporting bracket to enable it to descend and at the same time bring the knives into reciprocating and cutting operation.

Another object of the invention is the provision of a safe, compact slicing machine wherein the substance to be sliced is arranged beneath cutting knives which are inoperative during the loading operation but which are operatively brought into operation during the descent of the pivotal knife supporting bracket, the parts further being so constructed and arranged that the slices after they are cut will be on the support above the knives so as to positively and definitely eliminate all danger of the operator coming in contact with the movable knives.

A further object of the invention is the provision of new and novel means for maintaining the pivotal knife supporting bracket in an upright position during the loading of the machine and causing descent of the bracket and the operation of the knives when a simple lever is manually manipulated.

A still further object of the invention is the provision of a new and novel mounting for the reciprocating knives, the mounting consisting of tubular elements reciprocating on rods, there being improved means for causing alternate reciprocation of adjacent knives.

Still another object of the invention is the provision of a slicing machine which is provided with new and novel means for supporting the pivotally mounted knife carrying bracket in an inoperative position; which is provided with new and novel means for releasing the bracket and causing operation of the knives when preselected by the operator; which is provided with new and novel means for supporting and clamping a loaf to be sliced and maintaining the loaf in proper position during the slicing operation; which is provided with new and improved means for effecting the supporting and clamping of the loaf and for supporting the cut slices in proper position after the loaf is sliced; which is provided with new and improved means for limiting the speed of the gravitational descent of the pivotally mounted knife carrying frame; which is provided with new and novel crank mechanism for causing opposite reciprocation of the knife carrying frames so that alternate knives operate in opposite directions; which is provided with means arranged between the knife blades so as to prevent turning of the blades during the slicing operation particularly when loaves of bread of certain texture are being sliced; which is provided with a novel arrangement for permitting the cut slices to be immediately slid into a bag after being removed from the slice receiving support after the cutting operation; which is provided with a novel arrangement including switches for making the machine as safe as possible, whereby the operation of the knives and other movable elements are prevented from being operated unless intentionally caused to be operated by the operator; and which is provided with parts arranged and operated in a predetermined manner so as to make the machine compact, noiseless, efficient, safe, and ornamental.

Numerous other objects and advantages will be apparent throughout the progress of the following specification.

The accompanying drawings illustrate a selected embodiment of the invention and the views therein are as follows:

Fig. 2 is a detail longitudinal sectional view on the line 2—2 of Fig. 1;

Fig. 3 is a view similar to Fig. 2 but showing the knife supporting frames in elevated position;

Fig. 4 is a detail longitudinal sectional view on the line 4—4 of Fig. 1.

Fig. 5 is a detail longitudinal sectional view on the line 5—5 of Fig. 1;

Fig. 6 is a detail sectional view taken longitudinally of the pivoted knife supporting frame;

Fig. 7 is a detail transverse sectional view on the line 7—7 of Figs. 1 and 6;

Fig. 8 is a detail plan section on the line 8—8 of Fig. 2;

Fig. 9 is a detail sectional view on the line 9—9 of Fig. 1;

Figs. 10, 11 and 12 are detail elevational views showing the electric switch mechanism in progressive positions; and Figs. 13 and 14 are detail elevational views showing the mercury switch mechanism in progressive positions.

Figure 1:
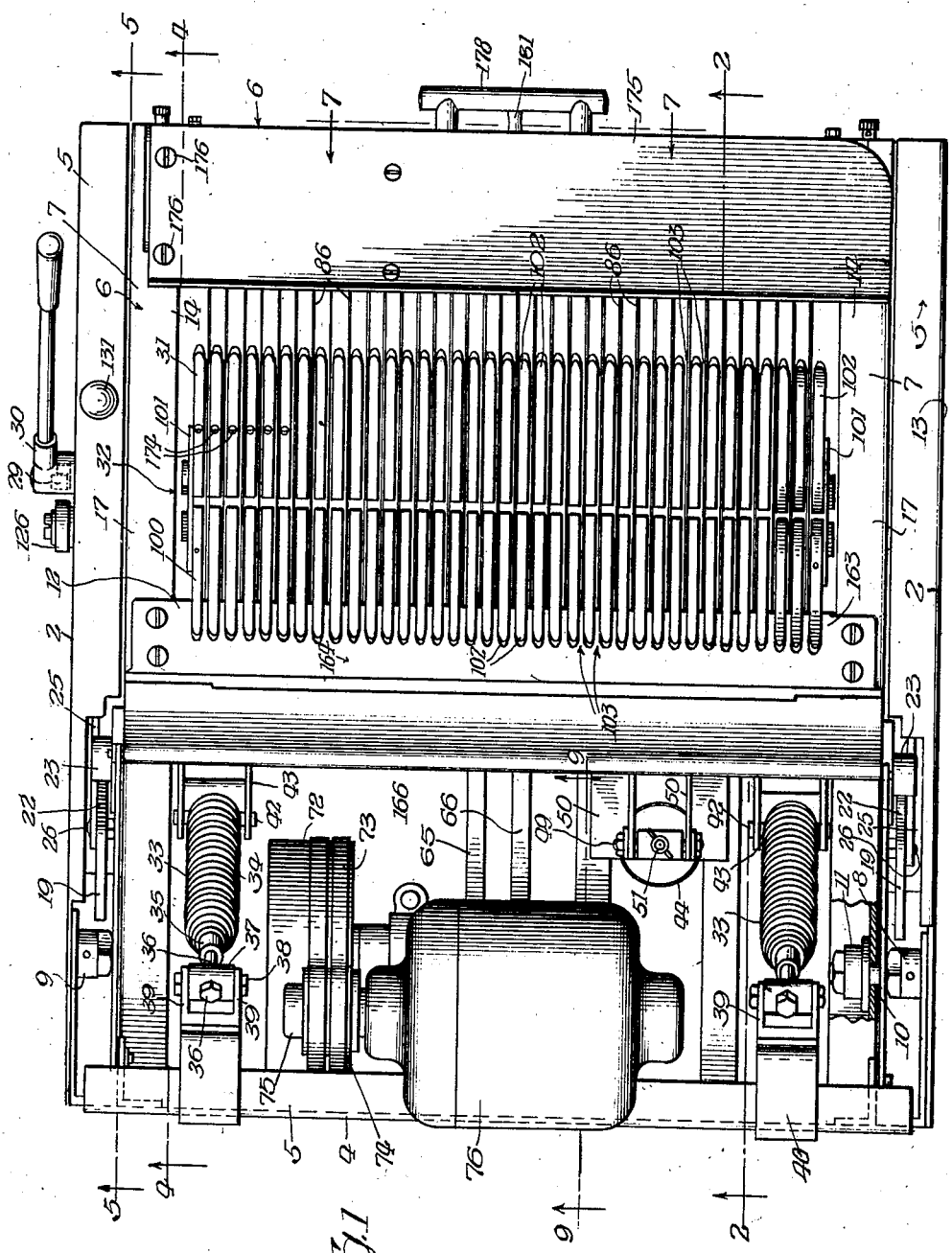
Fig. 1 is a detail plan view of the improved slicing machine, certain parts being broken away for the sake of clearness.

The particular bread slicing machine herein disclosed for the purpose of illustrating the invention comprises a base or supporting frame 1 which includes the side members 2, a cross member 3 and an end member 4. These members 2, 3 and 4 are metal supports and rigidly connect the parts of the frame together. The members 2 and 4 have inturned top flanges 5, Figs. 1, 8 and 9.

A knife supporting frame 6, Figs. 1, 2, and 3, comprising opposed side channels 7, is pivotally mounted on the side members 2, as indicated at 8, Figs. 1, 4 and 5. Bosses 9 are fixed to the inside of the side members 2 and receive pivot pins 10 which are also receivable in bosses 11 fastened rigidly to the inside of the channels 7, Fig. 1. An upper cross member 12 and a lower cross member 13, Figs. 2 and 3, are each rigidly secured to the upper inturned flanges 14 of the channel members 7 and rigidly connect the side channels 7 together near the inner ends thereof. Transverse upper and lower members 15 and 16 are rigidly fastened to the side frame members 7 at the extreme ends of the channel members 7, whereby the pivotally mounted rigid knife supporting frame 6 is provided. A transverse connecting bar 17 is also rigidly connected to the side members 2 and forms a support for the knife supporting frame 6 when the knife supporting frame is in its lowermost position, as shown in Figs. 2 and 4. Rubber bumpers 18 are adapted to be mounted on this transverse bar 17 and engage the under side of the connecting bar 16 of the frame 6 against which the knife supporting frame 6 abuts and stops upon during the end of the descent of the knife supporting frame 6. The knife supporting frame 6, therefore, comprises a rigid unit or frame which is pivotally mounted to the side supports 2 and is free to assume the raised position shown in Fig. 3 or the lowered position shown in Figs. 1, 2, and 4.

The knife supporting frame 6 is adapted to be supported in its upward pivoted position, Fig. 3, by resting upon cam plates 19 pivotally mounted at 20 to the sides 2 of the base or support, Figs. 4 and 5. The cams 19 are each provided with an upper peripheral portion 21 having its center at 20, and a curved or arcuate side edge forming a cam surface 22. The frame 6 is provided at opposite sides thereof with cam rollers 23, Figs. 1, 4, and 5, pivotally mounted on studs 24 which are rigidly secured to the side channel members 7 of the frame 6. Links 25 are pivotally connected at 26, Fig. 5, to the cam plates 19, and at 27 to crank arms 28 which are rigidly secured to a transverse shaft 29, Fig. 5. The end of the shaft 29 is rotatably mounted in suitable bearings in the side frame members 2.

An operating arm or lever 30 is rigidly secured to an end of the shaft 29 by being fixedly connected to one end of the shaft 29 which extends a predetermined distance through and beyond the side member 2 of the main support 1. Movement of the handle member 30, therefore, causes rotary or oscillatory movement of the transverse shaft 29, which movement is imparted to the links 25 for shifting the cam members 19 on their pivots 20.

A part 31 of the loaf receiving platform or trough 32 is rigidly secured to the transverse shaft 29. When the knife supporting frame 6 is raised, the shaft 29 will move in a clockwise direction, as viewed in Figs. 2 and 3, because of the weight of the part 31, the shaft 29 and part 31 moving from the position shown in Fig. 2 to the position shown in Fig. 3. Therefore, when the knife supporting frame is swung upwardly, being pivoted on its pivot supports 8, 9 and 10, the weight of the part 31 will turn the transverse shaft 29, Fig. 3, causing the cam members 19 to swing on their pivots so that the peripheral portions 21 thereof will be moved to position to permit the rollers 23 on the side bars or channels 7 of the frame 6 to rest upon the peripheral portion 21 of the cam members 19 and support the knife supporting frame 6 in its extreme upward position, as shown in Fig. 3. When the handle member 30 is swung from the position shown in Fig. 3 to the position shown in Fig. 5, the transverse shaft 29 will be rotated, and this rotative movement will cause the links 25 to shift the cams 19 on their pivots and shift the peripheral sides 21 of the cams 19 away from under the supporting rollers 23, whereby the rollers 23 will be freed from the peripheral surface 21 and will roll along the curved cam surface 22 of the cams 19, permitting the knife supporting frame 6 to descend by gravity. Inasmuch as the knife supporting frame 6 is relatively heavy, because of the cooperating mechanism which it supports, there are provided means tending to counterbalance the frame 6. The counterbalancing means comprises a pair of spaced spring members 33, each of which comprises a helical spring 34 having the upper end thereof fixed to a nut element 35, Figs. 2 and 3, into which a screw 36 threadedly engages. The screw 36 also passes through a sleeve 37, Fig. 1, through which attaching bolts 38 also pass. The attaching bolts 38 are mounted between ears 39 on a bracket 40 which is rigidly secured to the back of the support and on the frame member 4, Figs. 2 and 3. A reinforcing strut 41 is rigidly connected to the bracket 40 by welding or otherwise and is provided with a hook-shaped end which engages and is supported by the flange 5 on the frame member 4. The brackets 40 are, therefore, rigidly secured to the supporting base of the machine, and pivotally support the upper ends of the springs 33. Moreover, because the screws 36 attach the springs to the members 40, the springs may be adjusted lengthwise to increase or decrease their tension by rotative movement of the screws. The lower end of each spring 33 is operatively connected to a transverse support or member 42, Figs. 1 and 8, which is mounted between spaced supporting members 43. The members 43 are fixed to the transverse plate or bar 13 which rigidly connects the side frame members 7 of the knife supporting frame 6, Figs. 2 and 3.

The weight of the knife supporting frame 6, therefore, is somewhat counterbalanced by the counterbalancing means 33 which includes the spring 34. However, in order to govern or regulate the gravitational descent of the frame 6 but still permit it to descend freely and easily, a dash pot 44 is provided. This dash pot 44 comprises a cylindrical body which is pivoted at its lower end, as indicated at 45, Figs. 2 and 3, between braces or supports 46 rigidly connected to the parts 3 and 4 of the main supporting base 1. The dash pot 44 has a piston which operates in the cylinder, and this piston has an extension or piston rod 47 which extends through the top of the dash pot. The rod 47 extends into a block 48, Figs. 3 and 8, which is pivotally mounted on a pivot 49 supported between angle brackets 50 rigidly secured to the transverse cross bar 12. A member 51 threadedly mounted in the block 48 has operative connection with the piston rod 47, whereby adjustment may be effected to the piston in the dash pot. The downward gravitational movement of the knife supporting bracket 6 is caused to move slowly at the proper desired speed and in proper timed relationship because of the counterbalancing means 33 and the dash pot 44.

The knife supporting frame is provided with upper and lower knife frames 52 and 53, respectively, Figs. 3 and 4. These knife frames 52 and 53, Fig. 4, comprise spaced apart upper and lower tubes or sleeves 54 and 55 mounted on each side of the channels 7, being positioned within the upper and lower inturned legs 14 of the side channels 7. Upper transverse supporting members 56 and 57 rigidly connect the upper sleeves 54 together, while lower transverse supporting members 58 and 59 rigidly connect the lower sleeves 55. The knife frames 52 and 53, therefore, are separate rigid frames, each comprising the two longitudinal side sleeves and the front and rear transverse connecting members. Longitudinally extending upper and lower side guide rods 60 and 61, Fig. 4, slidably support the sleeves 54 and 55 respectively. The rods 60 and 61 are each rigidly supported at one end by a front plate 62 rigid with a part of the knife supporting frame 6, and at their opposite ends by being rigidly connected to upper and lower blocks 63 and 64 respectively, Fig. 4. The separate frames 52 and 53, therefore, are slidably mounted on the upper and lower pairs of rods 60 and 61, being free to slide forwardly and rearwardly independently of each other.

Crank arms 65 and 66, Figs. 8 and 9, are operatively connected to the frames 52 and 53, the crank arm 65 being operatively connected to the upper frame 52, while the crank arm 66 is operatively connected to the lower knife frame 53. Each of the frames 52 and 53 is provided with a rigid bifurcated extension 67 between which the arms 65 and 66 extend, being pivotally connected thereto, as indicated at 68, Fig. 2. The connection comprises a transverse pin forming the pivot 68 which extends through the bifurcated legs and upon which the ends of the crank arms 65 and 66 pivotally engage, Figs. 2 and 8.

The opposite ends of the crank arms 65 and 66, Figs. 8 and 9, are revolubly mounted on a transverse crank shaft 69 suitably mounted in bearings 70 in a supporting bracket 71 fixed to the end 4 of the supporting base 1. The crank shaft 69 is driven by a properly balanced fly-wheel or pulley 72 fixed to one end of the crank shaft 69. This fly-wheel 72 is driven by a belt or other driving element 73 from a pulley or drive wheel 74 on the shaft 75 of a motor 76, Fig. 1. In the particular embodiment herein shown, the fly-wheel or driven pulley 72, Fig. 8, is provided with grooves into which flexible belts 73 extend, the belts engaging complementary grooves in the upper pulley 74.

The motor 76 is rigidly but adjustably mounted to the part 4 of the machine support base 1, Fig. 9, being supported by a bracket 77. This bracket 77 includes a vertical plate 78 provided with holes 79 in alignment with elongated holes 80 in the part 4 of the base 1. Bolts 81 pass through said aligned holes and rigidly but adjustably support the bracket to the frame or support 1, permitting relative vertical adjustment of the motor supporting bracket 77. The bracket 77 is provided with an offset 82, Fig. 9, having a threaded opening 83 provided therein to receive a bolt 84 which passes through the inturned flange 5 on the member 4 so as to adjust the motor for proper belt tension. Bolts 85 pass through the cradle part of the bracket 77 and threadedly engage a part of the motor housing. The motor 76, therefore, is maintained in rigid position but is capable of adjustment to take up slack in the belts, or for other purposes. The motor also may be quickly and readily removed from its supporting bracket so as to permit easy access to several of the working parts of the machine beneath the motor and bracket.

The knife frames 52 and 53 are reciprocated reversely by the crank arms 65 and 66, and each knife frame has operatively connected thereto a plurality of longitudinally extending cutting knives 86, Fig. 6, the cutting edges of which are serrated and extend downwardly. The upper knife frame 52 carries a plurality of knife supporting members 88 which comprise channels, Figs. 6 and 7, having downwardly extending legs 89 rigidly connected by an integral straight or connecting portion 90, Fig. 7. The channels 88 abut against the edges of front and rear upper transverse Z-bars 87 which are fastened to the upper transverse members 56 and 57, Fig. 6, and those channels are properly arranged and spaced so as to receive a knife blade 86 therebetween. The adjacent channels are spaced apart a thickness equal to the thickness of the knife blades 86.

The lower frame 53, Figs. 6 and 7, carries a plurality of knife supporting members 91 which are identical with the upper knife supporting members 88 and include upwardly extending legs 92 connected by an integral connecting portion 93, Fig. 7. The knife supporting members 91 for this lower frame are also in the form of channels, which, like the upper members 88, abut against the edges of front and rear lower transverse Z-bars 87 fastened to the cross members 58 and 59. The legs 92 of the members 91 are spaced apart a distance equal to the thickness of a knife blade 86, and extend upwardly midway between the downturned legs 89 of the members 88, thereby to provide a compact structure and maintain the cutting edges of the knives in the same flat cutting plane. The upper knife supporting members 88 are connected to each of the cross members 56 and 57 of the upper knife frame 52 and extend downwardly therefrom, so as to support the ends of the knives 86 which extend longitudinally across the entire knife frame 52. The lower knife supporting members 91 are connected to each of the cross members 58 and 59 of the lower knife frame 53 and extend upwardly therefrom, so as to support the ends of the knives 86 which extend longitudinally across the entire knife frame 53. The supporting legs 89 of the members 88 extend downwardly, while the legs 92 of the members 91 extend upwardly. The knives 86 are, therefore, separately and independently connected to their respective frames so as to permit separate and independent movement, and while the knives on each frame are permitted to have separate and independent movement collectively, they are so positioned with respect to each other that the adjacent knives reciprocate in opposite directions. The knives of one frame are positioned midway between the knives of the other frame so that alternate knives will move in opposite directions during operation of the machine.

The adjoining legs 89 and 92 are provided at their forward ends (the end away from the operator and near the motor) with slots or V-shaped notches 94, Fig. 6, to receive a transverse lug, pin or bearing 95 on one end of each knife. The other ends of the knives have rigidly connected thereto a threaded screw member 96 which is received in cutouts 97 in the legs 89 and 92 of the members 88 and 91 respectively. The knife is therefore supported at this latter described end by being positioned in the space between the legs 89 or 92 with an end of the screw member 96 arranged in the slots 97 provided in the adjacent legs of the knife supporting members 88 and 91. Threaded sleeves or nuts 98 threadedly engage the end of the threaded members 96 and when screwed up to tightening position tighten the knives in place and provide for the proper tension. The ends of the nuts 98 may be provided with a cross slot so that they may be tightened by a screwdriver and, if desired, washers 99 may be inserted underneath the nuts 98 so as to provide proper bearing surfaces for the nuts 98, the washers being interposed and engaging the underside of the nuts and the extreme edges of the corresponding legs of the knife supporting members 88 or 91. The knives 86 are, therefore, held in position and may be maintained at the desired tension so as to perform properly the slicing operation. Moreover, the tension may be decreased or increased to suit the type of material being cut if necessary. Also, by the particular means of fastening the knives to their respective support, the knives may be readily and instantly removed or replaced. The present construction, therefore, makes it relatively easy to increase or decrease the tension on the knives, as well as to insert new knives or remove the old ones.

The motor 76 operates the crank shaft 69 which operates the respective crank arms 65 and 66 to reciprocate the knives carried by each of the upper and lower knife frames 52 and 53. In order to effect the slicing of a loaf, the knife supporting frame 6 is raised to its uppermost position, whereby the rollers 23 will engage the peripheral surface 21 on the cam members 19 and thereby maintain the knife supporting frame 6 in such upright position. The operator is now free to arrange a loaf of bread or other material to be sliced on the loaf supporting frame 32. The loaf is rested upon the support 31 with a side thereof engaging the cooperating rigid side 100 of the member 32. The end of the loaf may engage a plate 101 rigidly secured at each side of the machine to one of the fingers or prongs of the rigid part 100 of the loaf support 32. The part 100 of the loaf support 32 is rigidly secured to a transverse bar which is rigidly connected to the channel side members 2 and 3 of the base 1.

The loaf support 32, therefore, comprises a movable part 31 and the fixed part 100. Each part 31 and 100 comprises a plurality of spaced fingers 102 which are spaced apart a predetermined distance and opposite to each other. The fingers 102 are so located that the spaces 103 between the fingers are in alignment, permitting the knives to pass through the spaces between them. When a loaf of bread is to be sliced, it is placed on the part 31 of the substance support 32 after the knife supporting frame has been moved to its raised position. When the handle 30 is operated, the shaft 29 will be rotated and thereby move the substance support part 31 toward the rigid part 100, whereby the V-shaped trough 32 is formed to support the loaf.

The machine is made as safe as possible so as to protect the operator, the knives being prevented from operating unless it is intentionally desired to do so by the operator. A switch mechanism 104, Figs. 10–12, is provided to start the motor and operate the knives. This mechanism 104 is operated or controlled by the manipulation of the handle 30 which is attached to the shaft 29 and extends outside the machine frame. In normal position, with the knife supporting frame 6 in its lowermost position as shown in Figs. 2 and 4, the switch mechanism is such to shut off the electric current to the machine, there being conductors leading to the switch mechanism from a source of electric supply. The switch mechanism is such that an electric switch is prevented from being operated unless the knife supporting frame 6 is in its elevated position. When the knife supporting frame is in its elevated position, Fig. 3, the switch mechanism which operates the electric switch will be moved to operating position but the motor will still not operate because the switch mechanism has not yet operated the switch, although it is free to be operated. The switch mechanism 104 is controlled by manual operation of the lever 30. Thus, when the frame 6 is raised and the lever 30 operated, the switch operating mechanism will cause the switch to be closed to complete the electric circuit to start the motor. The switch operating mechanism is adapted to be operated to open the circuit when the knife supporting frame 6 reaches the limit of its downward travel. When the frame 6 comes to rest, it will engage a part of the switch operating mechanism and cause the parts again to assume normal position.

The switch operating mechanism 104 includes an electric snap switch 105, Figs. 10 to 12, of usual construction but which has an operating finger 106 extending a predetermined distance out of the top of the switch casing 107. A bell crank 108, which is pivotally connected at 109 to the side 2 of the supporting base 1, has the lower end of its arm 110 bifurcated, as indicated at 111. The switch stem or operating finger 106 is received in the bifurcation 110 so that when the bell crank 108 is operated, the stem or finger 106 will be operated to turn off or turn on the switch depending upon the movement of the bell crank and the position of the finger 106. A lever 112 pivoted on the shaft 29 has a bifurcated end 113 between the bifurcations of which there is pivotally mounted at 114 one end of a link 115. The other end of the link 115 is pivotally connected at 116 to the arm 117 of the bell crank 108. A plate 118 having an upstanding shelf or apron 119 is pivoted at 120 to the bar or lever 112 and has restricted tiltable movement with respect to the bar or lever 112. The under side of an extension 121 on the apron 119 of the plate 118 is adapted to be engaged by the upper side of the lever 112, the plate 118 being urged away by means of a relatively light spring 122. The plate 118 is provided with a tubular extension 123 into which a screw threaded member 124 is received. This screw 124 has an engaging knob or operating end 125 which is adapted to be pre-set by the crank arm or shaft hanger element 28 which is fixed to the transverse shaft 29 carrying the part 31 of the substance support 32. When the knife supporting frame 6 is in its lowermost position, as shown in Figs. 2 and 4, the knob member 125 will be in its lowermost position and be adjacent the end of the crank arm 28, as shown in Fig. 10.

When the knife supporting frame 6 is raised to its upper position as shown in Fig. 3, the crank arm 28 will be shifted to the position shown in Fig. 11 because the weight of the substance support part 31 will swing the shaft 29, causing the lever 30 to be moved to its lowermost position. The downward movement of the part 31 of the substance supporting rack 32 is limited by a projection on the end of the handle 30 engaging a rubber bumper 126, Fig. 1, fixed to the outside of the frame. However, when the handle 30 is raised to clamp the loaf between the two parts 31 and 100, the crank arm 28 will first have a side 127 thereof directly opposite the knob 125. The side 127 will come in direct contact with the knob 125 as the handle is continued to be raised to its uppermost position. This raising of the handle 30 will cause the side 127 on the crank arm 28 to move the plate 118. The plate 118 in turn causes the lever or bar 112 to be swung on its pivot, thereby operating the bell crank to work the switch 105. The movement of the pivoted bar 112 causes the plate 118 to be raised and swing the bell crank 108 on its pivot in a clockwise direction, Fig. 12, causing the switch operating finger 106 to be moved from open position shown in Figs. 10 and 11, to closed position shown in Fig. 12. The operation of the switch 105 starts the motor and all the knives will start to operate. The movement of the handle 30 to its uppermost position will shift the cams 19 so as to move the peripheral part 21 of the cams out from under the rollers 23 on the support 6, freeing the knife support 6 and allowing it to descend by gravity. The gravitational descent of the knife supporting frame 6 is checked properly by the dash pot 44. When the knife supporting frame 6 reaches the end of its downward travel, the bottom edge of one of the channel rails 7 will engage a resilient bumper 128 on the plate 118 and press the plate downwardly; and inasmuch as the plate 118 is secured operatively to the bar 112, it will shift this bar 112 downwardly and move the bell crank in a counter-clockwise direction, Fig. 12. The switch operating finger 106 will then be moved to the position shown in Fig. 10 and open the circuit to stop the motor, and consequently the movement of the knives.

The switch mechanism 104, therefore, will not operate the switch until after the machine is loaded and the handle 30 has been moved intentionally to its upward position. The movement of the handle 30 has then caused the motor to operate the knives to slice the loaf, and after the loaf slicing operation is completed, the knives will cease running as the switch will be operated when the frame 6 reaches its lower limit.

In order to permit manual operation of the switch operating mechanism, a rod 129 is provided. This rod 129 has its lower end attached to a part 130 on the plate 118, and its upper end extending through the flange 5 on the side 2. A knob 131 is applied to the end of the rod 129 to permit such manual operation. Thus, by pulling up or pushing down on the knob 131, the switch 105 may be operated manually.

Instead of using the switch mechanism just described, other switch mechanism 132, Figs. 13 and 14, may be used for operating a mercury switch. This latter mechanism comprises an electrical connector or plug 133 to which the electrical conductors 134 leading from a source of electric supply are electrically connected. The conductors 134 are arranged in a sheath or tubing 135 which extends through a bushed opening 136 provided for this purpose in the bottom of the frame or base 1. The electrical connector 133 includes an electrical snap switch 137 which has an operating finger or stem 138 extending through the side wall 2 of the base 1. This snap switch 137, like the snap switch 105, is adapted to be operated manually by the stem 138 to open or close the circuit. A mercury switch 139, Figs. 13 and 14, which has electric cooperation with the snap switch 138, has two leads 140 connected thereto. This mercury switch is electrically connected to the conductors 135 and to the electric conductors 141 which lead to the motor 76. The circuit between the conductors 134 and 141, therefore, may be made or broken by the mercury switch 139. However, the electric current is supplied to the connector or plug 133 by means of the manually operated snap switch 137.

The mercury switch 139 is connected to a bracket 142 which is pivotally mounted at 143 to the side wall 2. This bracket 142 includes an extending leg 144 which terminates in a U-shaped member 145. A trip finger support 146 which is secured to a leg 147 of the U-shaped member 145 carries a trip finger 148 urged against a stop by a push spring 149; the spring 149 may, if desired, be a torsion spring. The finger 148 is adapted to be engaged by a finger 150 on the crank arm 28 so that when the operating handle 30 on the shaft 29 is raised, the trip finger 148 will be contacted by the finger 150 to swing the bracket 142 on its pivot 143. Inasmuch as the mercury switch 139 is connected to the bracket member 142, the mercury switch will be tilted to make an electrical connection. The mercury switch 139 is of the usual type in which two contacts electrically connect when the mercury in the switch is at the end carrying the contacts, and disconnected to bare the contacts when the mercury is at the opposite end of the tube. An outwardly extending ledge or shelf 151 rigidly connected to the base 152 of the U-shaped member 145 is adapted to be engaged by an adjustably mounted stop member 153 on the knife supporting frame, Fig. 13, so that when the knife supporting frame 6 reaches its downward position, it will engage this ledge or shelf 151 and move the bracket 142 on its pivot 143. The pivotal movement of the bracket 142 causes the mercury in the switch to run away from its contacts, thereby breaking the circuit to the electric motor, causing the electric motor to stop, and consequently stopping the operation of the cutting knives 86. A tension spring 154 is connected to a part of the bracket 142 and to a pin 155 on a rigid bracket 156 fixed to the frame, so as to give a relatively fast or quick snap movement to the mercury switch. The spring 154 is normally dormant or inactive until the bracket 142 has been moved on its pivot 143 sufficiently to move the spring beyond the center of the pivot 143 at which time the spring becomes immediately active and shifts the mercury switch with a quick snap action.

When it is desired to operate the slicing machine, the snap switch stem 138 is operated to permit current to be supplied to the contacts in the switch 137. As the frame 6 is being raised, the projecting finger 150 on the crank arm 28 will fall from the position shown in Fig. 13 to the position shown in full lines in Fig. 14. The mercury switch has not yet been shifted to a position whereby the mercury will flow to cover the contacts of the mercury switch, so the machine will not yet operate. However, when the handle 30 is raised, the projection or finger 150 on the member 28 will engage the finger 148 and turn the bracket 142 on its pivot 143 causing the mercury switch 139 to be tilted to the dotted line position in Fig. 14. The tilting of the switch causes the mercury to flow down to the end of the tube and cover the contacts therein to complete the circuit. The machine is thus put in motion but it may be immediately shut off by the operation of the manual snap switch 137 which is adapted for operation independently of the mercury switch 139. The mercury switch can not operate the mechanism independently of the manual switch, nor can the manual switch operate the mechanism independently of the mercury switch. During the descent of the knife supporting frame 6, the ledge or shelf 151 which is attached to the bracket will be engaged by the member 153, causing the bracket 142 to shift on its pivot 143 and tilt the mercury switch, whereby the contact points will become bared of mercury and break the electrical circuit. The spring 154 is so connected that when the handle 30 is operated and the bracket turned, the movement will be gradual to a certain point and then move with a quick snap action. The spring 154, therefore, causes the circuit to be broken with a snap action because the movement of the bracket is controlled to a certain extent by the spring.

A casing or housing 157, Figs. 2, 3 and 9, is adapted to encase the motor and some of the other operating mechanism. This housing comprises an upper part 158 which is rounded as indicated at 159 and includes a rear leg 160 extending downwardly to the lower edge of the frame or base 1. The sides of the housing are closed to completely enclose part of the mechanism and to render a neat appearance. The part 160 engages some rubber bumpers 161 mounted on the end 4 of the frame 1, so as to fit tightly and neatly in position and prevent rattling or clashing of parts. The housing is fastened in position by being screwed to certain parts of the frame 1 or to extensions thereon.

In order to close the opening between the end 162 of the housing or casing and the adjacent upper surface of the knife supporting frame 6, a pivotal angle plate 163 is provided. This pivotal plate comprises an angularly shaped member 164 having a flat leg 165 which is secured to the side parts 7 of the knife supporting frame 6. The upwardly extending part of the member 164 is bent over to provide a tubular portion intermediate its ends to cooperate with a tubular portion on a connecting plate member 166. A rod 167 passes through these two tubular portions to pivotally connect the angle plate 163 with the connecting plate member 166. An upper end of the member 166 is also turned over to provide a tubular portion 168 into which there is mounted a rod 168'. Links 169 are pivotally connected at the ends of the rod 168' and are pivotally connected to pins 170 fixed to an angle 171 which is rigidly connected to the frame, Fig. 4. During the raising and lowering of the knife supporting frame 6, the opening between the frame and the knife support 6 is always closed, as the parts 163 and 164 are pivotally connected to respective parts of the machine to permit flexible movement. Rubber washers 172 may be inserted at the pivotal connections to produce a flexible noiseless pivotal connection.

Rubber feet 173 are fixed to the under side of the frame at predetermined positions to form a resilient support for the base and to prevent the machine from marring the structure upon which it is supported. It is desirable that there be provided a cross bar with a central support to provide proper support and suspension for the machine. It is further desirable that the entire machine be raised and properly supported so that a removable scrap pan extending under the entire machine may be used.

After the knife supporting frame 6 has descended to its lowermost position and the switch mechanism has been operated by such descent, the cut slices will be arranged in the substance supporting trough 32, and as the knives have extended clear through the loaf, the cut slices will be arranged above the knives. Therefore, the operator may remove the slices from the trough without danger of coming into contact with the sharp edges of the knives or in fact without coming in contact with the knives at all. If desired, either or both of the members 31 or 100 constituting the substance support 32, may be provided with substance engaging teeth or claws 174 to assist in supporting the loaf in position during the cutting operation. These teeth or claws are preferably formed by peening or otherwise upsetting a part of the metal of the fingers of the support 32.

After the slices have been cut, they may be removed bodily and in order and placed upon a supporting shelf or tray 175, Figs. 1, 2, and 3, which is mounted on the top of the knife supporting frame 6. This shelf is rigidly secured to the frame 6 at one end only as indicated at 176 and this shelf or tray is spaced a predetermined distance above the upper surface of the knife support 6 to permit a bag to be slid underneath so that all the cut slices, in proper order, may be slipped into a bag, Figs. 2, 3 and 4.

A removable plate 177, Figs. 2, 3 and 4, is attached to the front of the knife support 6, being provided with a handle 178 to allow the knife support 6 to be raised easily to upright position, Fig. 3. This front plate 177 is provided with openings through which oil cups 179 pass. These oil cups 179 are adapted to threadedly engage the bars 60 and 61 upon which the individual knife frames slide so that lubricant may be fed to the individual knife frame bearings. The bars 60 and 61 are provided with means to permit lubrication thereof so that the sleeves will be freely slidable thereon. The oil cups 179 are arranged at the ends of the bars to receive the lubrication. Shutters 179' are provided on these oil cups to prevent the lubricant carried in the cups from spilling out, Fig. 2.

A sliding tray or drawer 180 having an operating handle 181 is slidably arranged at the under side of the machine to catch crumbs and particles resulting from the slicing operation. The end of the drawer is provided with a flange 182, which when the drawer is in position, covers one of the frame cross members to prevent the accumulation of crumbs or other debris.

Operation

To operate the device to perform a slicing operation, the knife carrying frame 6 is moved from its normal rest position, as shown in Figs. 1, 2, and 4, to the raised position shown in Fig. 3. When the knife supporting frame 6 has been raised to the position shown in Fig. 3, it will be suported in that position because the rollers 23 on the knife supporting frame 6 are on the peripheral surfaces 21 of the cams 19. As the frame 6 is being raised from the position shown in Fig. 2 to the position shown in Fig. 3, the substance supporting shelf 31 of the substance support 32 will be in a relatively horizontal position, as shown in Fig. 3. The substance to be sliced is then mounted on top of the part 31 of the member 32 with the forward side of the substance substantially engaging the rigid part 100. The end of the loaf is adapted to engage either one of the end plates 101. After the loaf has been so positioned, the handle 30 is raised, whereby the part 31 will be moved upwardly, forming a relatively V-shaped trough into which the loaf is supported. The movement of the handle 30 also operates the switch mechanism 104 or 132 to cause operation of the motor 76 which, in turn, through the cranks 65 and 66, causes alternate reciprocation of the knife supporting frames 52 and 53. The upward movement of the handle 30 also moves the cams 19, bringing the peripheral portions 21 thereof out from under the rollers 23, whereby the rollers 23 will engage the curved portions 22 of the cams and permit the knife supporting frame 6 to descend by gravity. During the descent of the knife supporting frame 6, the loaf will be sliced by the knives 86 which are rapidly reciprocating, alternate knives reciprocating in opposite directions. After the knife supporting frame 6 has reached the end of its downward travel, a projection on the bottom of the knife supporting frame will strike an operating part of the previously described switch mechanism and shut off the current, whereby the motor will stop running and the knives will stop moving. Inasmuch as the knives are completely free of interference, the cut slices may be removed from the trough and placed upon the shelf 175, whereby they may be put in proper order into a bag or wrapper, or the bag slipped over the shelf to receive the slices on the shelf.

The invention provides a compact, efficient, positively operating bread slicer which is safe and practically fool-proof, as the loading and unloading is done with the machine at rest. Moreover, the parts of the machine are so arranged as practically to eliminate the possibility of its being caused to operate unintentionally. The parts are so arranged and constructed that changes and repairs may be made quickly and rapidly without danger. Moreover, the construction of the machine is such as to be practically noiseless in operation. The machine is also capable of various adjustments so as to permit continued flawless and efficient operation and to overcome noise and vibration as much as possible.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A slicing machine comprising a frame, a raisable knife suporting frame adapted to descend by gravity and pivotally mounted on the first named frame, supporting means including a pivotally mounted suporting member for holding the knife supporting frame in raised position, a pair of knife frames in the knife supporting frame, a motor for reciprocating said knife frames, and means including a common manually controlled member for causing operation of the motor and conjointly moving the supporting member about its pivot to release the knife supporting means and allow gravitational descent of the knife supporting frame.

2. A slicing machine comprising a frame, a raisable knife supporting frame adapted to descend by gravity and pivotally mounted on the first named frame, supporting means including a pivotally mounted supporting member for holding the knife supporting frame in raised position, a pair of knife frames in the knife supporting frame, a motor to reciprocate the knife frames, means including a manually operable lever to shift the supporting lever member about its pivot to release the knife supporting frame and allow the knife supporting frame to descend by gravity, and means controlled by said manually operable lever to start the motor as the knife supporting frame is released.

3. A slicing machine comprising a frame, a raisable knife supporting frame pivotally mounted on the first named frame, supporting means for holding the knife supporting frame in raised position, a pair of knife frames in the knife supporting frame, links pivoted to the supporting means, a shaft mounted in the frame, crank arms on the shaft to which the links are pivotally connected, an operating lever rotationally to move the shaft to operate the links and shift the supporting means from supporting position to release the supporting frame, means to operate the knife frames, and means controlled by the operating lever to cause operation of the last named means.

4. A slicing machine comprising upper and lower side bars, sleeves surrounding the bars and slidable thereon, upper and lower cross bars rigidly connecting the upper and lower sleeves at each end to provide knife frames, knives removably connected at one end to the upper and lower cross bars at one end of the frame, threaded means operatively connecting the other ends of the knives to knife frames at the other end thereof, and a pivotally mounted frame movable in a vertical arc rigidly supporting said side bars, said side bars including a hollow portion, lubricating cups screwed into the ends of the side bars, and means permitting the passage of lubricant from the cups to the exterior surfaces of the side bars whereby to lubricate the exterior surfaces of the side bars and the interior surfaces of the sleeves.

5. A slicing machine comprising upper and lower side bars, sleeves surrounding the bars and slidable thereon, transverse upper and lower cross bars rigidly connecting the upper and lower sleeves at each end to provide knife frames, knives removably connected at one end to the upper and lower cross bars at one end of the frame, threaded means operatively connecting the other ends of the knives to knife frames at the other end thereof, and a pivotally mounted frame movable in a vertical arc rigidly supporting said side bars, said side bars including a hollow portion, lubricating cups screwed into the ends of the side bars, and means permitting the passage of lubricant from the cups to the exterior surfaces of the side bars whereby to lubricate the exterior surfaces of the side bars and the interior surfaces of the sleeves, said cups being provided with rotatively mounted shutters to prevent the lubricant from spilling out.

6. A slicing machine comprising a casing, a knife supporting frame pivotally mounted on the casing and adapted to descend by gravity, longitudinally extending knife frames reciprocally mounted in the knife supporting frame, means for reciprocating said knife frames individually, means to support the frame when swung on its pivotal mounting to raised position, said means being operable during said movement, and pivotally mounted means to release the last named means to permit the knife frame to descend by gravity.

7. A slicing machine comprising a casing, a knife supporting frame pivotally mounted on the casing, knife frames reciprocally mounted in the knife supporting frame, means for reciprocating said knife frames individually, a shelf plate mounted above the top of the knife supporting frame at one end thereof, there being a space between the under side of the plate and the top of the knife supporting frame on which it is mounted to receive a bag whereby cut slices on the shelf may be inserted into the bag.

8. A slicing machine comprising a support, a raisable knife supporting frame pivotally mounted on the support, a substance support having a part thereof movable with respect to another part thereof, said movable part dropping to a predetermined position upon raising movement of the frame, means for supporting the frame in raised position, and means adapted simultaneously to move the movable substance support part toward the fixed part and to move the supporting means to release the knife supporting frame.

9. A slicing machine comprising a support, a raisable knife supporting frame pivotally mounted on the support, a substance support having a part thereof movable with respect to another part thereof, said movable part dropping to a predetermined position upon raising movement of the frame, cams pivoted to the support and movable to position to support the knife supporting frame when the knife supporting frame is raised, and operable means to shift the cams out of supporting position and to move the movable substance part toward the fixed part.

10. A slicing machine comprising a pivotally mounted knife supporting frame, knives carried by the frame, a motor for reciprocating the knives, electrical means including switch mechanism controlling the operation of the motor, a substance support including a movable member, means for shifting the movable member when the knife supporting frame is raised, means controlled by said movable member to set the switch mechanism at a predetermined position, means for supporting the knife supporting frame in raised position, and manually operable means for shifting the movable part of the substance support for releasing the knife supporting frame and for operating the electrical means to cause operation of the motor.

11. A slicing machine comprising a pivotally mounted knife supporting frame, knives carried by the frame, a motor for reciprocating the knives, electrical means including switch mechanism controlling the operation of the motor, a substance support including a movable member, means for shifting the movable member when the knife supporting frame is raised, means controlled by said movable member to set the switch mechanism at a predetermined position, means for supporting the knife supporting frame in raised position, and manually operable means for shifting the movable part of the substance support for releasing the knife supporting frame and for operating the electrical means to cause operation of the motor, and means operated by the knife supporting frame during its descent to operate the electric means and stop the motor.

12. A slicing machine comprising a pivotally mounted knife supporting frame, knives carried by the frame, a motor for reciprocating the knives, electrical means including switch mechanism controlling the operation of the motor, a substance support including a movable member, means for shifting the movable member when the knife supporting frame is raised, means controlled by said movable member to set the switch mechanism to a predetermined position, means for supporting the knife supporting frame when in raised position, manually operable means for shifting the movable part of the substance support for releasing the knife supporting frame and for operating the electrical means to cause operation of the motor, means operated by the knife supporting frame during its descent to operate the electrical means and stop the motor, said electrical means including the aforesaid switch and a mercury switch, means for preventing operation of the mercury switch when the first switch is off, and means controlled by the position of the knife supporting frame to permit operation of the mercury switch.

13. A slicing machine comprising a pivotally mounted knife supporting frame, knives carried by the frame, a motor for reciprocating the knives, electrical means including switch mechanism controlling the operation of the motor, a substance support including a movable member, means for shifting the movable member when the knife supporting frame is raised, means controlled by said movable member to set the switch mechanism at a predetermined position, means for supporting the knife supporting frame in raised position, manually operable means for shifting the movable part of the substance support for releasing the knife supporting frame and for operating the electrical means to cause operation of the motor, means operated by the knife supporting frame during its descent to operate the electrical means and stop the motor, said electrical means and switch mechanism including an electric snap switch and a mercury switch, means for preventing operation of the mercury switch when the snap switch is off, means controlled by the position of the knife supporting frame to permit operation of the mercury switch, and additional manually operated means to operate the mercury switch independently of the knife supporting frame.

14. A slicing machine comprising a support, a raisable knife supporting frame pivotally mounted on the support, a substance support having a part thereof movable with respect to another part thereof, means for supporting the knife supporting frame in raised position, and means adapted simultaneously to move the movable part of the substance support toward the fixed part thereof and the supporting means to release the knife supporting frame.

15. A slicing machine comprising a pivoted frame, knives mounted in said frame for reciprocation, supporting means to support the frame in raised position, means to release the supporting means frome the frame to permit the frame to descend, means to reciprocate the knives, means initiated by operation of said release means for the supporting means to operate said knife reciprocating means during descent of the frame, and means to prevent operation of the knife reciprocating means when the frame has reached the limit of its descent.

16. A slicing machine comprising a support, a raisable knife supporting frame pivotally mounted on the support, a substance support having a part thereof movable with respect to another part thereof, a cam pivotally mounted on said first support, said cam having a surface extending in a generally vertical direction and an upper surface extending in a generally horizontal direction to provide a support for said frame when raised, cam engaging means on said frame for riding on said cam surfaces, means for moving said cam about its pivot to support said frame in raised position and to release the substance frame for downward movement, said cam engaging means riding on said generally vertical surface of the cam during downward movement of the frame, and means interconnecting said cam and said movable part of the substance support to lock the said movable part in a predetermined position during engagement of the cam engaging means with said generally vertical surface.

17. A slicing machine comprising a support, a manually raisable knife supporting frame pivotally mounted on the support, a substance support having a part thereof movable with respect to another part thereof, a cam pivotally mounted on said support, said cam having a surface extending in a generally vertical direction and an upper surface extending in a generally horizontal direction to provide a support for said frame when raised, cam engaging means on said frame for riding on said cam surfaces, means providing for moving said movable part of the substance support to a predetermined position away from the fixed part of the support, interconnecting means between said movable part of the substance support and said cam providing for moving the cam about its pivot to support said frame in raised position on said upper surface of the cam, means for moving said movable part of the substance support towards the fixed part thereof and for releasing the frame for downward movement, said cam engaging means riding on said generally vertical surface of the cam during downward movement of the frame, and said interconnecting means preventing movement of said movable part of the substance support during engagement of the cam engaging means with said generally vertical surface.

18. A slicing machine comprising a main frame, a raisable knife supporting frame pivotally mounted on the first named frame for movement about a fixed axis, a pair of cam members pivoted to the main frame and having upper cam portions extending in a generally horizontal direction, means for moving the cams and said upper portions to a predetermined position to support the knife supporting frame on said upper cam portions when the knife supporting frame is in raised position, and a handle operatively connected to said cams to move the cams from said predetermined supporting position to release the knife supporting frame from said upper cam portions and permit it to drop independently of further action by said cams.

19. In a slicing machine having a base, a knife supporting frame, knife frames slidable in the supporting frame, cranks for operating the knife frames, and a motor for operating the cranks, means for supporting said motor comprising a hanger for said motor, elongated openings being provided in the base and in alignment with openings provided in the hanger, bolts passing through said openings adjustably to support the hanger, screw means passing through a part of the base and threadedly engaging the hanger adjustably to lock the hanger in position, a curved cradle on the hanger to support the motor intermediate its ends, and bolts passing through the cradle and engaging the motor rigidly to secure the motor to the cradle.

20. A slicing machine comprising a base, a knife supporting frame pivotally mounted on said base for movement in a vertical arc, knife frames in the knife supporting frame, motor drive means for reciprocating said knife frames, a casing for enclosing said motor drive means extending upwardly above said knife supporting frame, a forward edge of said casing terminating a predetermined distance above the knife supporting frame when the latter is in lowered position to provide an opening for said vertical movement of the knife supporting frame, a pair of hingedly connected closure members for substantially closing said opening irrespective of the angular position of said knife supporting frame, one of said closure members being attached to the knife supporting frame, the other of said closure members being guided for movement in a generally vertical path, and linkage means pivotally connected to said last named closure member and a fixed part of the machine for effecting said guiding action.

21. A slicing machine comprising a casing, a raisable knife supporting frame pivotally mounted on the casing, knife frames reciprocally mounted in the knife supporting frame, means for reciprocating said knife frames individually, a substance support including a movable and a fixed part for supporting a loaf of substance to be sliced, supporting means for said movable part providing for movement of the part by gravity to a predetermined lowered position with respect to said fixed part when the knife supporting frame is raised, means for raising said movable part toward the fixed part to support a loaf therebetween, means for supporting the knife frame in raised position, and interconnecting means providing for releasing said knife frame supporting means upon operation of the said next to last named means.

22. A slicing machine comprising a support, a raisable knife supporting frame pivotally mounted on the support, a substance support having a part thereof movable with respect to another part thereof, supporting means for said movable part providing for movement of the part away from said other part to a predetermined position upon raising movement of the frame, means for moving the movable part in a predetermined direction toward the other part, means for supporting the knife frame in raised position, and interconnecting means providing for releasing said knife frame supporting means upon operation of the said next to last named means.

23. A slicing machine comprising a support, a raisable knife supporting frame pivotally mounted on the support, a substance support having a part thereof movable with respect to another part thereof, supporting means for said movable part providing for movement of the part to a predetermined position away from said other part upon raising movement of the frame, cams pivoted to the support and having supporting surfaces, rollers on the knife supporting frame engageable with the periphery of the cams, and means interconnecting said movable part and said cams providing for shifting the cams to bring the supporting surfaces in position to support the knife supporting frame upon movement of the movable part towards said predetermined position when the knife supporting frame is raised.

24. A slicing machine comprising a support, a raisable knife supporting frame pivotally mounted on the support, a substance support having a part thereof movable with respect to another part thereof, supporting means for said movable part providing for movement of the part to a predetermined position away from said other part upon raising movement of the frame, cams pivoted to the support and having supporting surfaces, rollers on the knife supporting frame engageable with the periphery of the cams, means causing shifting of the cams to bring the supporting surfaces in position to support the knife supporting frame when the knife supporting frame is raised, knife frames mounted in the knife supporting frame, a motor for operating the knife frames, an electrical circuit including a switch for controlling the motor, and a single member operable to cause operation of the movable substance part towards the other part, release of the cam support for said knife supporting frame, and operation of the switch to start the motor.

25. A slicing machine comprising a main frame, a knife supporting frame pivotally mounted on said main frame for movement between a raised and lowered position, a knife frame reciprocably mounted in said knife supporting frame, a motor for reciprocating said knife frame, a substance supporting tray having one part movable towards and away from another part thereof, switch means for controlling said motor, means controlled by movement of said first tray part for closing said switch means, and means preventing movement of the first tray part to close the switch means until said knife supporting frame is moved to said raised position.

26. A slicing machine comprising a main frame, a knife supporting frame pivotally mounted on said main frame for movement between a raised and lowered position, a knife frame reciprocably mounted in said knife supporting frame, a motor for reciprocating said knife frame, a substance supporting tray having one part movable towards and away from another part thereof, switch means for controlling said motor, means operated by said knife supporting frame upon movement to said lowered position for opening said switch means, means operable by movement of said first tray part away from said other part to set said switch means for closing, means for closing said switch means upon movement of said first tray part towards said other part, and means preventing movement of the first tray part away from the other part until said knife slicing frame is moved to said raised position thereby to prevent closing operation of the switch means during raising movement of the knife supporting frame.

27. A bread slicing machine comprising a main frame, a knife supporting frame pivotally mounted on said main frame for movement between a raised and lowered position, knife frames reciprocably mounted in said knife supporting frame, means for reciprocating said knife frames during downward movement of said knife supporting frame, a loaf supporting means mounted on said main frame, said loaf supporting means comprising a pair of comb-like members arranged to form a substantially V-shaped tray and adapted to clamp a loaf along longitudinally extending portions thereof, means providing for movement of one of said comb-like members to a lowered substantially horizontal position to facilitate the placing of a loaf in said tray, means for supporting the knife supporting frame in raised position, and means for simultaneously raising said last named comb-like member to clamp a loaf in fixed position along said longitudinal portions thereof and moving said supporting means to release the knife supporting frame.

ARTHUR H. AHRNDT.